United States Patent [19]

Wolfinger

[11] 4,317,371
[45] Mar. 2, 1982

[54] TORSIONAL VIBRATION MONITOR

[75] Inventor: John F. Wolfinger, Schenectady, N.Y.

[73] Assignee: General Electric Company, Schenectady, N.Y.

[21] Appl. No.: 173,643

[22] Filed: Jul. 30, 1980

[51] Int. Cl.³ .............................................. G01H 1/10
[52] U.S. Cl. ......................................... 73/650; 73/660
[58] Field of Search ................. 73/650, 658, 659, 660; 324/161; 361/236

[56] References Cited

U.S. PATENT DOCUMENTS

| | | | |
|---|---|---|---|
| 2,915,897 | 12/1959 | Hoffmann | 73/659 |
| 3,885,420 | 5/1975 | Wolfinger | 73/650 |
| 3,934,459 | 1/1976 | Wolfinger et al. | 73/650 |
| 4,121,272 | 10/1978 | Wolfinger | 73/650 |
| 4,148,222 | 4/1979 | Wolfinger | 73/650 |
| 4,209,778 | 6/1980 | Wehde et al. | 73/660 |

Primary Examiner—Anthony V. Ciarlante
Attorney, Agent, or Firm—Ormand R. Austin; John F. Ahern

[57] ABSTRACT

An improvement in torsional vibration monitors wherein a frequency shift is applied to the torsional vibration signal to achieve improved stability and increased confidence in the measurement. The torsional vibration signal is applied to parallel frequency shifters to produce a lower frequency measuring signal and a lower frequency reference signal. The two lower frequency signals are applied to parallel connected filters to obtain spectral content of the signals. Once the spectral content is obtained, each lower frequency measuring signal and each lower frequency reference signal is shifted back to the original frequency range to produce filtered reference signals and filtered measuring signals. These signals are then correspondingly summed to provide a set of torsional vibration signals segregated with respect to the frequency spectrum and meaningful with respect to a time base.

8 Claims, 1 Drawing Figure

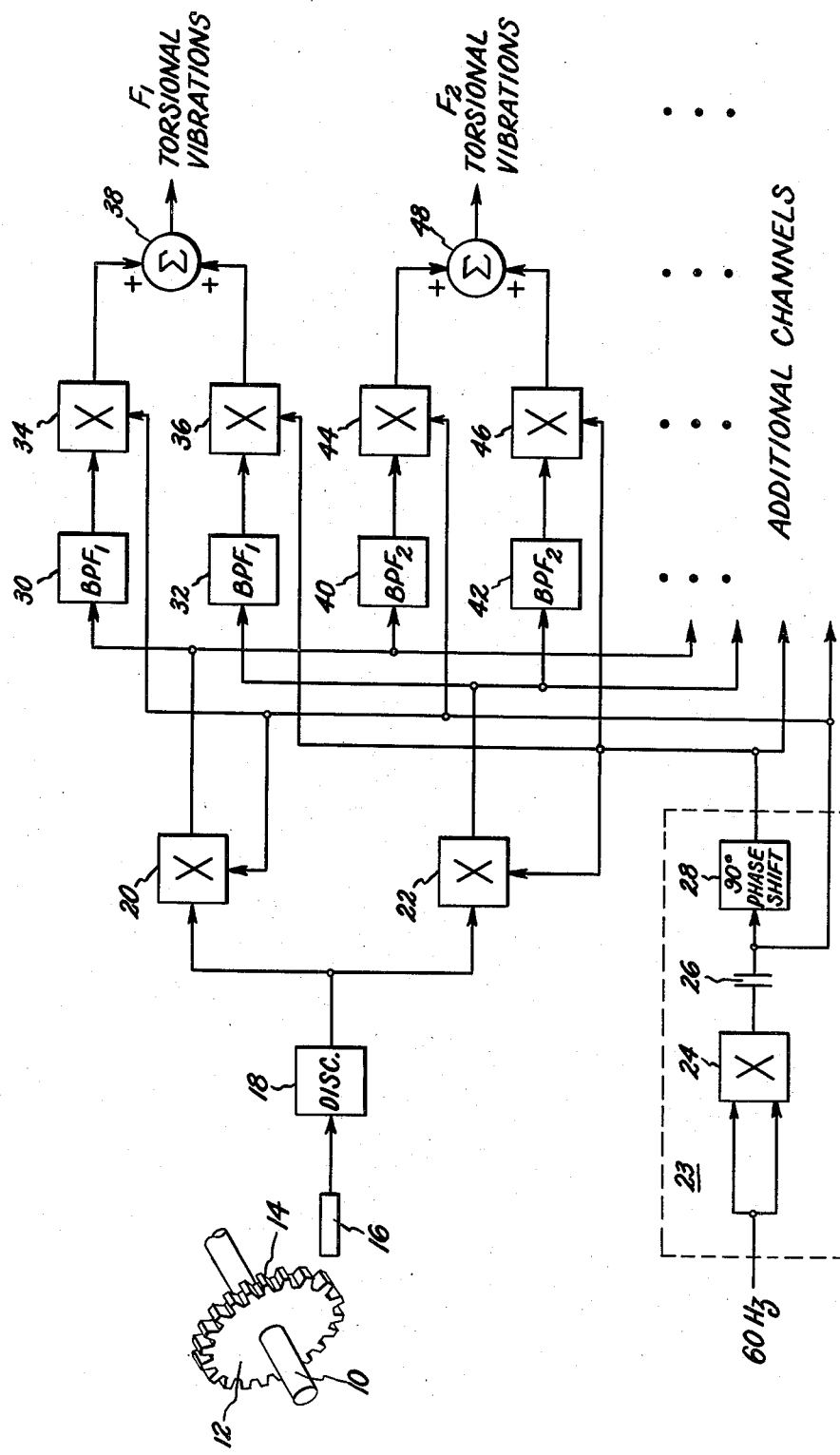

TORSIONAL VIBRATION MONITOR

The present invention relates to a method and apparatus for measuring torsional vibrations in a rotating shaft.

BACKGROUND OF THE INVENTION

Torsional vibrations in a rotating shaft are manifested as a deviation from a uniform angular velocity and will, therefore, appear as phase, or equivalently, frequency modulation of any signal indicative of instantaneous angular velocity. Torsional vibrations are of particular concern to operators of large turbine-generators sets such as those used in the electric power generation industry. For these very large machines, even the smallest torsional vibration in the rotating shaft can cause damaging levels of stress, and may, in the most extreme case, cause shaft breakage and permanent damage to the machine itself. For example, the shaft of a large steam driven turbine-generator set may weigh several tons and may be severely damaged by a torsional vibration of only 0.01 degree. Obviously, it becomes highly desirable to be able to monitor the shaft torsional vibrations of such machines so that early corrective action can be taken.

For a turbine-generator connected to supply power to an electrical load, a fault on the connected power line produces, through the magnetic field interaction, a reaction torque on the rotating shaft which causes torsional vibrations within a band of frequencies at twice the machine running speed. These vibrations, for example, would appear at about 120 Hz. on the 60 Hz. machines employed in the United States.

Torsional vibration monitors useful for turbine-generators are, of course, now well known in the art as exemplified by the method and apparatus of Wolfinger taught in U.S. Pat. Nos. 3,885,420 and 4,148,222. However, in many instances, such as the above-mentioned cause of line fault produced torsional vibrations at 120 Hz., it becomes necessary to ascertain the spectral content of the torsional vibrations. Prior art techniques have suffered in this regard because of drift problems in the very narrow band-pass filters used to separate the spectral content of the torsional vibration signal. Significant uncertainty in the spectral analysis has resulted.

Accordingly, it is the principal objective of the present invention to provide stable, drift-free means by which the torsional vibrations of a rotating shaft may be monitored and analyzed for spectral content, and which means is particularly useful when applied as a monitor for a turbine-generator set.

Other objects, features, and advantages of the invention will become apparent from the following summary and detailed description of the invention.

SUMMARY OF THE INVENTION

In a preferred embodiment of the invention, the instantaneous angular velocity of the rotating shaft to be monitored is sensed to produce a signal whose phase contains the desired torsional vibration information. A discriminator is utilized to obtain, from the angular velocity signal, the fundamental, composite, instantaneous torsional vibration signal. The signal thus obtained is then applied to parallel frequency shifters which, in one form of the invention, are analog multipliers. In the first of the two frequency shifters, multiplication is by a sine wave signal having a frequency equal to the desired amount of frequency shift; in the second frequency shifter, multiplication is by a cosine wave signal at the same frequency as the sine wave signal applied to the first multiplier. Each multiplier/shifter, as is well known to those of skill in the art, produces sum and difference frequencies. The difference frequency signals, referred to in the case of the first multiplier as the lower frequency measuring signal and in the case of the second multiplier as the lower frequency reference signal, are then sorted by series connected filters to separate the spectral content of the signals into narrow frequency bands at the lower frequency levels. For example, the torsional oscillations in the shaft of a turbine-generator in the frequency range of 120 Hz., the torsional oscillation signal is advantageously shifted in frequency by 120 Hz. by multiplying that signal by sine and cosine wave signals of 120 Hz. The resultant lower frequency measuring and reference signals are then in the range of 0 Hz. at which frequency each signal is then passed through a plurality of parallel connected narrow band filters to separate the spectral content of each signal. This frequency shift and filtering technique is advantageous in that the spectral information may be obtained at lower frequency level by filters having a ratio of bandwidth to center frequency which is much larger than would be possible without a frequency shift to lower frequency levels. The result is improved stability and increased confidence in the measurement.

Once the spectral content is thus obtained, each lower frequency measuring signal and each lower frequency reference signal is then shifted back to the original measuring frequency range by again multiplying by sine or cosine wave signals, as appropriate, to produce filtered reference signals and filtered measuring signals. These signals are then correspondingly summed to provide a set of torsional vibration signals segregated with respect to the frequency spectrum. Each signal of the set of signals is meaningful with respect to a time base since the time base fidelity is preserved by generating the reference signals simultaneously with the generation of the measuring signals and by correspondingly combining reference and measuring signals.

BRIEF DESCRIPTION OF THE DRAWINGS

While the specification concludes with claims particularly pointing out and distinctly claiming the subject matter regarded as the invention, the invention will be better understood from the following description taken in connection with the accompanying drawing in which the sole FIGURE is a block diagram of a preferred embodiment of the invention.

DETAILED DESCRIPTION OF THE INVENTION

Referring now to the drawing, there is shown a vibration monitor according to the present invention for detecting torsional vibrations in a rotating shaft 10. A shaft-mounted member having a plurality of circumferentially spaced elements, represented by gear 12 having a plurality of teeth 14, is attached to shaft 10 for rotation therewith. A magnetic pickup probe 16 of a type well known in the art for providing an output signal in response to movement of teeth 14 is mounted in close proximity to gear 12. The output signal from probe 16 is indicative, by its frequency, of the instantaneous angular velocity of the rotating shaft 10. Torsional vibrations of the shaft 10 are inherent in the angular velocity signal obtained from probe 16 and appear as phase or frequency modulation of the angular velocity signal.

Accordingly, discriminator 18, which is a means well known in the art for demodulating phase or frequency modulated signals, provides a signal at its output which is indicative of the instantaneous torsional vibrations in shaft 10. Discriminator 18 may, for example, be of the type disclosed in the above-mentioned U.S. Pat. No. 3,885,420, the disclosure of which is incorporated herein by reference thereto.

Although the signal from discriminator 18 is indicative of instantaneous torsional vibrations in shaft 10, such signal is not in the most highly useful form since the torsional vibrations are typically the composite result of superposing a number of vibrations on shaft 10. Those portions of the circuitry of the drawing following the discriminator 18, therefore, are directed to separating the composite torsional vibration signal obtained from the discriminator 18 into separate spectral categories so that a more complete analysis of the shaft's torsional vibrations can be carried out.

The composite torsional vibration signal from discriminator 18 is applied to parallel connected first and second analog multipliers 20 and 22, respectively, each of which functions in the present invention as a frequency shifter for the torsional vibration signal. Each multiplier 20 and 22 has a second input signal by which the composite torsional vibration signal is multiplied. These second input signals are derived from a shift frequency generator 23 comprised of multiplier 24, capacitor 26, and 90° phase shift network 28. For monitoring the torsional vibrations in the shaft of a 60 Hz. turbine-generator set, for example, and particularly in those situations wherein it is desirable to monitor vibrations at twice the generator running speed, the second input signals to multipliers 20 and 22 are preferably at a frequency of 120 Hz. In such cases, the 120 Hz. signal is obtained by applying a 60 Hz. signal to both inputs of multiplier 24 which, as is known from well established mathematical relationships, produces an output sine wave signal at twice the frequency of the input signal as well as d.c. component which is removed by capacitor 26. It will be recognized, of course, that any desired frequency may be used and that other frequencies and means for generating the second input signals for multipliers 20 and 22 may be used. However, it is highly advantageous when monitoring the torsional vibrations of the shaft of a turbine generator to derive the second input signals to multipliers 20 and 22 from the generator's electrical output. For example, in the drawing, the 60 Hz. input to shift frequency generator 23 is preferably obtained from the generator whose shaft is being monitored. In such cases, the torque caused by line fault appears at exactly 0 hz. after the above-mentioned (and further discussed below) frequency shift occurs. This is so even though the machine speed may change momentarily by a small but significant amount due to the transient load change.

The second input signals to multipliers 20 and 22 are separated in phase 90°, providing, in effect, a sine wave input to first multiplier 20 and a cosine wave input to the second multiplier 22. The rationale for such a phase separation will be more fully explained herein below. The sine wave signal from the shift frequency generator 23 is taken from the junction of capacitor 26 and the input to the phase shift network 28; the cosine wave signal is taken from the output of phase shift network 28 which applies a 90° phase shift to the sine wave signal coupled through capacitor 26.

With multipliers 20 and 22 functioning as frequency shifters, each produces an output signal containing frequencies at the sum of the frequencies of the two input signals and frequencies equal to the difference in frequency between the two input signals. This shift frequency effect is well-known to those of ordinary skill in the art and each multiplier 20 and 22 may be regarded, in this case, as shifting the torsional vibration signal both up and down in frequency by a fixed amount, e.g., 120 Hz. The lower frequency signal produced by multiplier 20 is referred to herein as the lower frequency measuring signal, and the lower frequency signal produced by multiplier 22 is referred to herein as the lower frequency reference signal.

The output signal from multipliers 20 and 22, including the lower frequency measuring signal and the lower frequency reference signal, are passed to parallel connected spectrum analysis channels. The exact number of such channels is variable to suit the particular analysis need, but for purposes of illustrating and explaining the invention two such channels are shown in the drawing. The first illustrated spectrum analysis channel comprises band pass filters 30 and 32, multipliers 34 and 36, and summing junction 38; the second spectrum analysis channel comprises band pass filters 40 and 42, multipliers 44 and 46, and summing junction 48. Band pass filters 30 and 32 are identical in their frequency response characteristics and each passes only a narrow band of frequencies in the range of the lower frequency measuring signal; the higher frequency outputs from multipliers 20 and 22 are severely attenuated by these filters. For example, with a 120 Hz. frequency multiplier signal from the shift frequency generator 23, and with torsional oscillations of shaft 10 in the range of 120 Hz., the lower frequency measuring signal may be centered around 0 Hz. In such case, filters 30 and 32 are simply low pass filters having an upper cutoff frequency of, for example, 5 Hz. The filtered low frequency signals from filters 30 and 32 are passed, respectively, to multipliers 34 and 36 which function as frequency shifters to return the filtered signals back to the original measuring frequency range. It is important to note, however, that the signals have been filtered so that the output of multipliers 34 and 36 are, as a result, restricted to a narrow frequency range. Frequency shift in multipliers 34 and 36 is achieved by multiplying the low frequency filtered signals from, respectively, filters 30 and 32 by, respectively, sine wave and cosine wave signals of identical frequency which are taken from shift frequency generator 23 as has been described above. The output of multiplier 34, a filtered measuring signal, and the output of multiplier 36, a filtered reference signal, are combined in summing junction 38 to restore the time base reference to the signal. Time base restoration at the original measuring frequency level is a result of the sine-cosine relationship of the multiplying signals from shift frequency generator 23 and is predictable as a result of well known mathematical relationships. The output of summing junction 38 is a narrow frequency band signal representing torsional vibrations of shaft 10 which fall within such frequency band. The output of junction 38 may be taken directly to a signal recording means for permanent storage of the information.

The second spectrum analysis channel, comprising filters 40 and 42, multipliers 44 and 46, and summing junction 48 is functionally similar to the first channel described above. However, the channels differ in that band-pass filters 40 and 42 pass a band of frequencies different from the band passed by filters 30 and 32. For example, filters 40 and 42 may have a band-pass of from 5 to 10 Hz. Additional spectrum analysis channels may be added, as is indicated in the drawing, to cover the entire band of torsional vibration frequencies of interest. The torsional vibration output signals, as from summing junctions 38 and 48, represent torsional vibrations of shaft 10 falling within a particular frequency range.

It will be recognized, therefore, that a torsional vibration monitor has been described which reduces the uncertainty in analyzing torsional vibrations in a rotating shaft by providing stable, drift-free means for ascertaining the spectral content of such vibrations. This result is achieved by providing means for shifting the torsional vibration signal to a lower frequency region, using narrow band filtering means having a high bandwith to center frequency ratio to thereby enhance filter stability and reproducability, and then shifting the segregated signals back to the original frequency measuring band for reconstruction and recording. Thus, while a specific example of the invention has been set forth in describing a preferred embodiment of the invention, it is understood that a various modifications may be made therein by those skilled in the art. It is intended by the appended claims to claim all such modifications which fall within the true spirit and scope of the invention.

What is claimed is:

1. Apparatus for monitoring the torsional vibrations of a rotating shaft, comprising:
    means for producing a signal representation of the instantaneous angular velocity of said shaft;
    means responsive to said instantaneous angular velocity signal for producing a signal representation of composite instantaneous torsional vibrations of said shaft;
    first means for shifting said instantaneous torsional vibration signal from a measuring frequency range to a lower frequency range to produce a lower frequency measuring signal;
    second means for shifting said instantaneous torsional vibration signal from said measuring frequency range to said lower frequency range to produce a lower frequency reference signal shifted in phase from said lower frequency measuring signal;
    a plurality of frequency spectrum analysis channels, each said channel including
    (a) means for filtering said lower frequency measuring signal to remove frequency components outside a preselected frequency band;
    (b) means for filtering said lower frequency reference signal to remove frequency components outside said preselected frequency band;
    (c) means for shifting said lower frequency measuring signal back to said measuring frequency range after filtering to produce a filtered measuring signal;
    (d) means for shifting said lower frequency reference signal back to said measuring frequency range after filtering to produce a filtered reference signal; and
    (e) means for combining said filtered measuring signal and said filtered reference signal to produce a torsional vibration signal representation of shaft torsional vibrations within a preselected frequency range.

2. The apparatus of claim 1 wherein said means to produce a composite instantaneous torsional vibration signal is a discriminator.

3. The apparatus of claim 2 wherein said first and second means for shifting said instantaneous torsional vibration signal to a lower frequency range are each analog multipliers.

4. The apparatus of claim 3 wherein for each said spectrum analysis channel
    (a) said means for filtering said lower frequency measuring signal is a band-pass filter;
    (b) said means for filtering said lower frequency reference signal is a band-pass filter;
    (c) said means for shifting said lower frequency measuring signal back to said measuring frequency range is an analog multiplier;
    (d) said means for shifting said lower frequency reference signal back to said measuring frequency range is an analog multiplier;
    (e) said means for combining said filtered reference signal and said filtered measuring signal is a summing junction.

5. A method for monitoring torsional vibrations in a rotating shaft, comprising the steps of:
    (a) generating a signal representation of the instantaneous angular velocity of said shaft;
    (b) demodulating the phase of said instantaneous angular velocity signal to produce a signal representation of torsional vibrations in said shaft;
    (c) shifting the frequency of said torsional vibration signal from a measuring frequency range to obtain a lower frequency measuring signal;
    (d) shifting the frequency of said torsional vibration signal from said measuring frequency range to obtain a lower frequency reference signal shifted in phase from said lower frequency measuring signal;
    (e) filtering said lower frequency measuring signal with a plurality of parallel connected filters to produce a plurality of spectrally distributed lower frequency measuring signals;
    (f) filtering said lower frequency reference signal with a plurality of parallel connected filters to produce a plurality of spectrally distributed lower frequency reference signals;
    (g) shifting each spectrally distributed lower frequency measuring signal and each spectrally distributed lower frequency reference signal back to said measuring frequency range; and
    (h) correspondingly combining measuring signals and reference signals to obtain a set of signals representative of the spectral content of torsional vibrations of said shaft.

6. The method of claim 5 wherein said lower frequency measuring signal and said lower frequency reference signal are separated in phase by 90 degrees.

7. A method for monitoring torsional vibrations in the rotating shaft of a turbine-generator set having an electrical output whose frequency is proportional to shaft speed, said method comprising the steps of:
    (a) generating a signal representation of the instantaneous angular velocity of said shaft;
    (b) demodulating the phase of said instantaneous angular velocity signal to produce a signal representation of torsional vibrations in said shaft;
    (c) shifting the frequency of said torsional vibration signal from a measuring frequency range by an amount proportional to the frequency of said electrical output to obtain a lower frequency measuring signal;
    (d) shifting the frequency of said torsional vibration signal from said measuring frequency range by an amount proportional to the frequency of said electrical output to obtain a lower frequency reference signal shifted in phase from said lower frequency measuring signal;

(e) filtering said lower frequency measuring signal with a plurality of parallel connected filters to produce a plurality of spectrally distributed lower frequency measuring signals;

(f) filtering said lower frequency reference signal with a plurality of parallel connected filters to produce a plurality of spectrally distributed lower frequency reference signals;

(g) shifting each spectrally distributed lower frequency measuring signal and each spectrally distributed lower frequency reference signal back to said measuring frequency range; and (h) correspondingly combining measuring signals and reference signals to obtain a set of signals representative of the spectral content of torsional vibrations of said shaft.

8. The method of claim 7 wherein said lower frequency measuring signal and said lower frequency reference signal are separated in phase by 90 degrees.

* * * * *